United States Patent [19]

Knierim

[11] Patent Number: 4,823,301

[45] Date of Patent: Apr. 18, 1989

[54] METHOD AND CIRCUIT FOR COMPUTING RECIPROCALS

[75] Inventor: David L. Knierim, Wilsonville, Oreg.

[73] Assignee: Tektronix, Inc., Beaverton, Oreg.

[21] Appl. No.: 111,965

[22] Filed: Oct. 22, 1987

[51] Int. Cl.$^4$ .................................................. G06F 7/52
[52] U.S. Cl. .................................... 364/761; 364/748; 364/765
[58] Field of Search ............ 364/748, 761, 764, 765, 364/762, 763, 766, 767

[56] References Cited

U.S. PATENT DOCUMENTS

| | | | |
|---|---|---|---|
| 3,633,018 | 1/1972 | Ling | 364/765 |
| 3,648,038 | 3/1972 | Sierra | 364/765 |
| 3,777,132 | 12/1973 | Bennett, Jr. | 364/765 |
| 4,718,032 | 1/1988 | Irukulla et al. | 364/765 |

Primary Examiner—Gary V. Harkcom
Assistant Examiner—Dale M. Shaw
Attorney, Agent, or Firm—Daniel J. Bedell; Robert S. Hulse

[57] ABSTRACT

A circuit produces an output binary floating point number approximating with high accuracy the inverse of an input binary floating point number D in accordance with the expression $(1/D) \approx [(1/A) - C] + [C - (B/A^2)]$, where the number A is a low accuracy approximation of D, and B is substantially equal to D−A. C is a number selected for each value of A such that the exponents of quantities $[(1/A) - C]$ and $[C - (B/A^2)]$ are equal to the exponent of the quantity $\frac{1}{2}A$. Quantities $[(1/A) - C]$ and $[C - (B/A^2)]$ are produced by lookup tables and summed to provide an approximation of 1/D.

12 Claims, 5 Drawing Sheets

METHOD AND CIRCUIT FOR COMPUTING RECIPROCALS

BACKGROUND OF THE INVENTION

The present invention relates in general to digital data processing circuits and in particular to a method and circuit for generating an output floating point number approximately equal to the inverse of an input floating point number.

In digital computers, floating point numbers are usually characterized by a set of bits representing a mantissa, another set of bits representing an exponent, and a single bit representing the sign (positive or negative) of the number. Floating point processors often include high speed circuits for adding, subtracting, and multiplying binary floating point numbers, and a circuit for finding the reciprocal of a binary floating point number. Division of one number by another is typically carried out by first inverting the denominator and then multiplying the inverse of the denominator by the numerator. But circuits for inverting numbers have either been slow or expensive, or produce output numbers that approximate an inverse with relatively low accuracy. One typical circuit, illustrated in FIG. 1, generates an output number approximating the inverse (1/D) of an input floating point number D. The circuit of FIG. 1 utilizes a lookup table 10, suitably implemented by a read only memory (ROM) addressed by the mantissa of input floating point number D, to produce the mantissa of the inverse number 1/D. Another lookup table 12, suitably implemented by another ROM addressed by the exponent of the input floating point number, negates and offsets the input number exponent to produce the exponent of the output number. The output number is then formed by concatenating the mantissa and exponent outputs of tables 10 and 12 and the sign bit of D. The circuit of FIG. 1 inverts numbers quickly because it requires only two ROM accesses that can be carried out simultaneously. However, the circuit is impractical for inverting floating point numbers with high accuracy due to the size of the ROM needed to implement table 10. For example, when the input and output numbers have 23-bit mantissas, a ROM implementing table 10 would have to store over eight million separately addressable 23-bit numbers.

FIG. 2 shows a well-known circuit of the prior art for implementing the following inversion algorithm:

$$Rb = Ra*[2-(Ra*D)]$$

where Ra is a "first pass" estimate of the inverse (1/D) of an input floating point number D, and Rb is a "second pass" estimate of 1/D. The "*" symbol represents multiplication. Ra is produced by a circuit similar to the circuit of FIG. 1 including mantissa and exponent lookup tables 10' and 12', similar to tables 10 and 12 of FIG. 1 except that the mantissa lookup table 10' is addressed only by a most significant portion of the bits of the mantissa of input number D. For example, when the mantissa of D is 23 bits, only the most significant 12 bits of D need be applied to address a ROM implementing table 10. The ROM would store only 4096 separately addressable 12-bit data words, and a ROM of such size is inexpensive and readily available. The first pass estimate output Ra and the input number D are multiplied by a floating point multiplier 14, and the result is subtracted from the constant 2 by a floating point subtractor 16 to provide a floating point number equal to $2-(Ra*D)$. The output of subtractor 16 is then multiplied by another multiplier 18 to produce the second pass estimate Rb of the inverse of (1/D) which has a mantissa accurate to about 23 bits. While the circuit of FIG. 2 utilizes a substantially smaller ROM in comparison to the circuit of FIG. 1 to provide an output estimate of 1/D of similar accuracy, the circuit of FIG. 2 requires more time to invert a number, because in addition to performing a ROM access, it must also subsequently perform two floating point multiplications and a floating point subtraction.

SUMMARY OF THE INVENTION

In accordance with one aspect of the present invention, a circuit generates an output signal representing a floating point number approximating the reciprocal (1/D) of an input floating point number D represented by an input signal. The circuit implements the following expression:

$$(1/D) \approx (1/A) - (B/A^2) \quad [1]$$

where A is a floating point number that would be represented by the input signal when a set of less significant (low order) bits of the mantissa of D is ignored, and where B is a floating point number approximately equal to $D-A$. In accordance with a preferred embodiment of the invention, lookup tables are utilized to simultaneously generate $1/A$, $1/A^2$ and B. The quantity $B/A^2$ is then formed by supplying $1/A^2$ and B as inputs to a multiplying circuit. Thereafter, the output of the multiplying circuit is subtracted from $1/A$ to provide the output number approximating 1/D in accordance with expression [1]. The preferred embodiment of the invention thus provides for an accurate estimate of 1/D by performing a set of simultaneous table lookup operations followed by a single multiplication and then a single subtraction operation.

In accordance with another aspect of the invention, in an alternative embodiment thereof, a floating point number inversion circuit estimates 1/D in accordance with the relation:

$$(1/D) \approx [(1/A) - C] + [C - (B/A^2)] \quad [2]$$

where the value of C is chosen for each value of A so that the terms $[(1/A)-C]$ and $[C-(B/A^2)]$ of [2] are floating point numbers having the same exponents as the floating point number ($\frac{1}{2}$A). The common exponent of the terms $[(1/A)-C]$ and $[C-(B/A^2)]$ is supplied by a single lookup table in response to the exponent of D. At the same time, the mantissas of the terms $[(1/A)-C]$ and $[C-(B/A^2)]$ are produced by separate lookup tables in response to portions of the mantissa of D. The floating point numbers $[(1/A)-C]$ and $[C-(B/A^2)]$ thus provided by the lookup tables are supplied as inputs to a summing circuit to form an approximate value of (1/D) in accordance with expression [2]. Thus, the alternative embodiment of the invention produces the approximate value of 1/D in the time required to perform a single table lookup followed by one floating point summation.

It is accordingly an object of the invention to provide an improved circuit for rapidly computing an accurate approximation of the reciprocal of a floating point number.

The subject matter of the present invention is particularly pointed out and distinctly claimed in the concluding portion of this specification. However, both the organization and method of operation of the invention, together with further advantages and objects thereof, may best be understood by reference to the following description taken in connection with accompanying drawings wherein like reference characters refer to like elements.

DRAWINGS

DETAILED DESCRIPTION OF THE INVENTION

A decimal floating point number expressed in scientific notation typically includes a sign ($+$ or $-$), a mantissa comprising a decimal number between 1 and 10 (e.g. 1.1234), and a signed base 10 exponent (e.g. $10^{+2}$ or $10^{-2}$). Many digital circuits operate on signals conveying binary floating points numbers which are similar to decimal floating point numbers in that they include signs, mantissas, and exponents but which are expressed in binary rather than decimal form. There are many formats for binary floating point numbers, but typically a binary floating point number conveyed by a multiple bit signal is represented by a "sign" bit indicating whether the number is positive or negative, a set of bits defining a base 2 exponent in some binary form, and another set of bits defining a mantissa in some binary form. For example, the Institute of Electrical and Electronics Engineers (IEEE) standard p754 describes a 32-bit floating point number wherein a first bit is the sign bit, the next eight bits define a signed base 2 exponent in offset binary form, and the remaining 23 bits define the mantissa by indicating the fractional portion of a number between 1 and 2 (decimal) in binary form.

Let D be a binary floating point number represented by a sign bit, a first set of bits defining an exponent of D and a second set of at least $M+N$ bits defining a mantissa of D, where M is greater than or equal to N. In particular, the mantissa of D is a number between 1 (inclusive) and 2 (exclusive) and the second set of bits defines the fractional portion of the mantissa. Let A be another binary floating point number similar to D except wherein all but the M most significant bits of the mantissa are suppressed so that A is substantially equal to D, within the accuracy provided by an M-bit mantissa, but is in fact somewhat smaller than D. Let B be a floating point number having $M+N$ bits in its mantissa and as nearly equal to $D-A$ as possible, given the limited number of bits in the mantissa of B. Then the value of D is approximately equal to $A+B$, and a floating point number approximating the inverse (1/D) of D may be computed in accordance with the following expression:

$$(1/D) \approx 1/(A+B) \qquad [3]$$

The right hand side of expression [3] may be expanded by partial fractions and rewritten to form the equivalent expression:

$$(1/D) \approx (1/A) - B/[A^2 + (A*B)] \qquad [4]$$

If M is relatively large (for example greater than 3 or 4), then $A^2$ is much greater than $A*B$ for all values of D. In such case the term $A*B$ can be deleted from expression [4] without substantially altering the accuracy of the expression. Thus for M relatively large the expression, $$(1/D) \approx (1/A) - B/A^2 \qquad [5]$$

is substantially equivalent to expression [4], and may be used to compute an estimated value of 1/D that has a mantissa accurate to $M+N$ bits.

Figure 3:
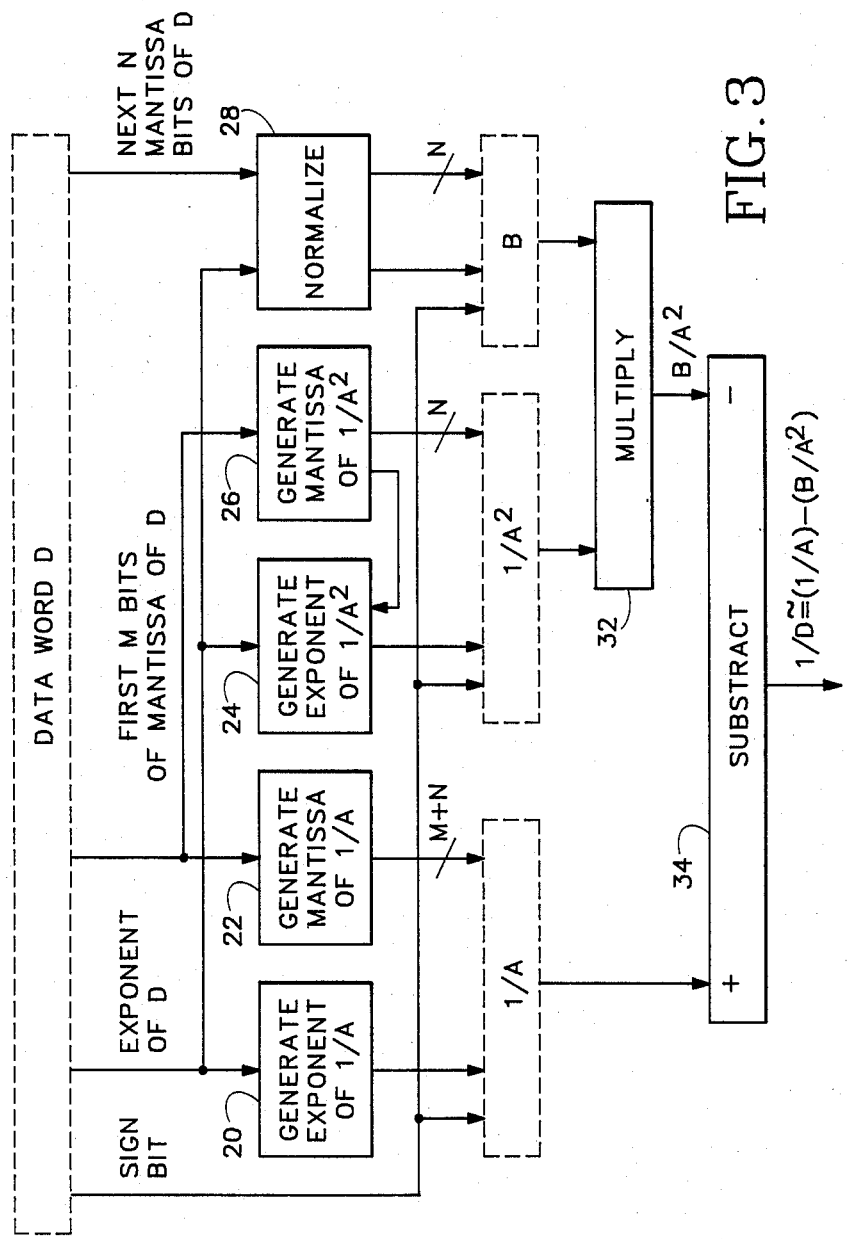
FIG. 3 is a signal flow diagram of a circuit for computing the reciprocal of a number in accordance with a preferred embodiment of the present invention.

FIG. 3 is a signal flow diagram illustrating signal processing steps in computing an estimate of the inverse (1/D) of a floating point number D in accordance with expression [5]. The exponent of D and the first M bits of the mantissa of D are converted in steps 20 and 22, respectively, to produce the exponent and mantissa, respectively, of a floating point number approximately equal to the inverse of A, the mantissa of the value 1/A determined in step 22 being accurate to $M+N$ bits. The sign bit of D and the exponent and mantissa outputs of steps 20 and 22 combine to form the floating point number 1/A. It is desirable that the resulting floating point number 1/A be expressed in normalized floating point form wherein the mantissa of 1/A is a number between 1 and 2. Since the M-bit data supplied as input to step 22 represents in binary form a number between 1 and 2 (decimal), the inverse of such number is between 0.5 and 1.0. In order to ensure that the mantissa of 1/A produced in step 22 is between 1 and 2, step 22 carries out the operations of inverting its input number and multiplying the result by 2. Step 20 carries out the operations of negating the exponent of D and then subtracting one from the result to produce the appropriate exponent of 1/A. The exponent of 1/A is offset by one in this manner in order to account for the multiplication of its mantissa by a factor of 2 in step 22.

The exponent of D and the first M bits of the mantissa of D are also provided as inputs to steps 24 and 26, respectively, which produce in response thereto the exponent and mantissa of a floating point number $(1/A^2)$ approximately equal to the inverse of $A^2$, the mantissa of $1/A^2$ being accurate to at least N bits. The sign bit of D and the output data produced in steps 24 and 26 combine to form $1/A^2$. It is also desirable to ensure that the floating point number $1/A^2$ is expressed in normalized floating point form. Since the input data for step 26 represents in binary form a number between 1 and 2 (decimal), the square of the inverse of such number is between 0.25 and 1 (decimal). In order to ensure that the mantissa of $1/A^2$ produced by step 26 is between 1 and 2, step 26 inverts its input number, squares the inverse, and then multiples the result by a factor of either two or four depending on whether the input number to step 26 is greater than or less than $2^{\frac{1}{2}}$. Step 24 includes the substeps of negating and doubling its input number, and then subtracting one or two from the doubled result to produce the appropriate exponent of $1/A^2$. Step 24 determines whether to offset the exponent of $1/A^2$ by one or two in accordance with an additional signal produced by step 26 indicating whether the mantissa was multiplied by two or four.

While the M most significant bits of the mantissa of D are supplied to steps 22 and 26, the next N most significant bits of the mantissa of D and the exponent of D are supplied as inputs to a step 28 which provides in response thereto the exponent and N-bit mantissa of B. The input to step 28 represents a small number (approximately D−A) on the order of $D/2^M$ or less. Thus, in order to ensure that the mantissa of B is normalized to a value between 1 and 2, step 28 multiplies it by the particular power of two needed to provide a result between 1 and 2. The exponent of B is set equal to the sum of the exponent of D and the negative of the exponent of that particular power of two. The floating point value B is formed by the exponent and the N-bit mantissa produced by step 28 in combination with the sign bit of D.

The floating point numbers $1/A^2$ and B are multiplied (step 32) to produce a floating point number approximately equal to $B/A^2$, within the accuracy provided by an M+N bit mantissa. This value of $B/A^2$ is subtracted (in step 34) from the floating point number $1/A$ supplied by steps 20 and 22 to provide the floating point number $1/A - B/A^2$, also having an M+N bit mantissa, that approximates the value of $1/D$ in accordance with expression [5].

Figure 4:
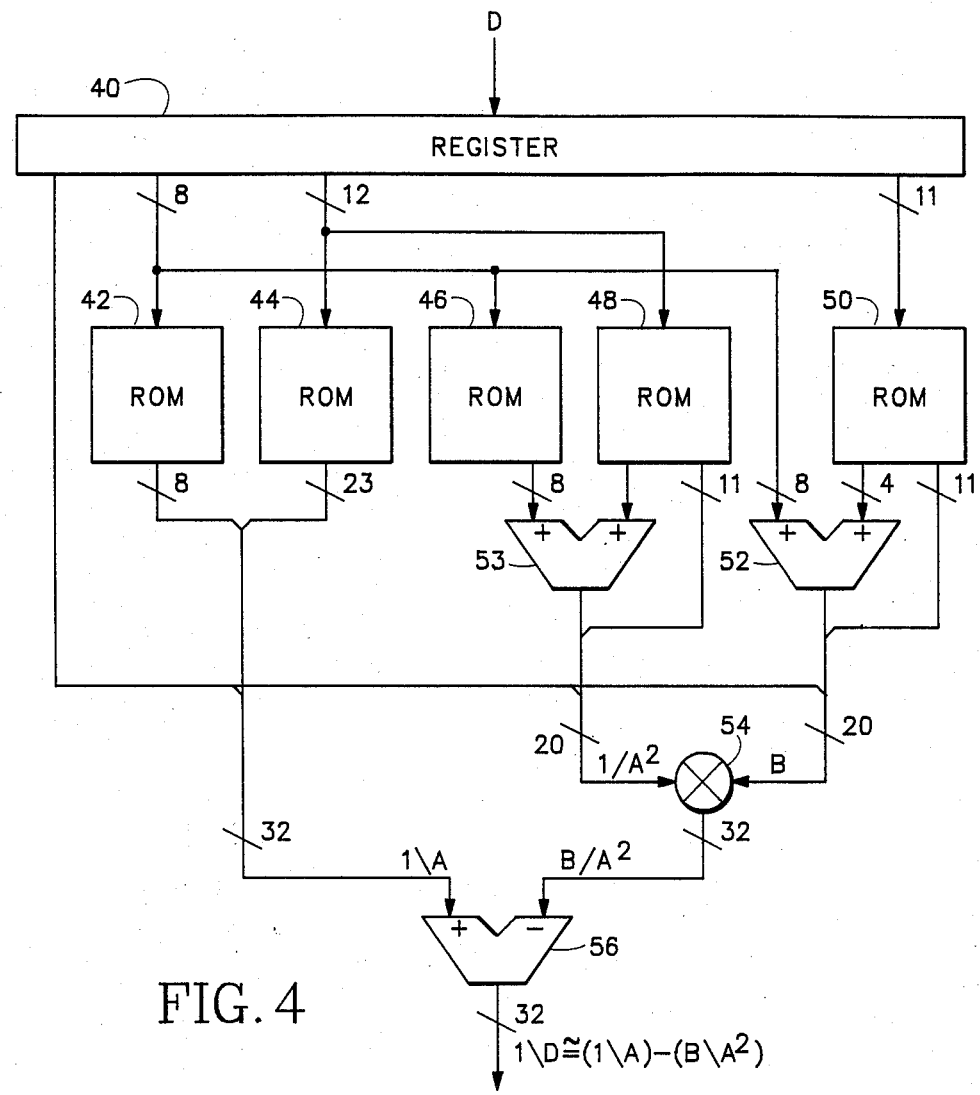
FIG. 4 is a block diagram of a circuit for computing the reciprocal of a number in accordance with the preferred embodiment of the present invention.

FIG. 4 is a block diagram of a circuit for implementing the data processing steps of FIG. 3 to invert a 32-bit floating point number D stored in a register 40 which number D, by way of example, is formatted in accordance with the previously mentioned 32-bit IEEE standard p754. Thus in this example, D has a single sign bit, an 8-bit exponent, and a 23-bit mantissa. The 8-bit exponent of D stored in register 40 is supplied to addressing inputs of a pair of read only memories (ROMs) 42 and 46 and also to an input of an integer adder 52. The M (e.g. 12) most significant bits of the mantissa of D stored in register 40 provide an address input to a ROM 44 and also to a ROM 48. The N (e.g. 11) next most significant bits of D stored in register 40 address another ROM 50. (It should be understood that in the example case M may be less than 12 and N may be less than 11 but by reducing M and N the accuracy of the inversion circuit is reduced.)

At each address in ROM 42 is stored an 8-bit number that is equal to the negative of the value represented by its address, offset by one. Thus ROM 42 comprises a lookup table that implements the function of step 20 of FIG. 3. At each address in ROM 44 is stored an M+N bit number that is substantially equal to the inverse of the number represented by its address, multiplied by two, so that ROM 42 operates as a lookup table implementing step 22 of FIG. 3. The sign bit of D stored in register 40, and the output bits produced by ROMs 42 and 44 together form the floating point number $1/A$ that is supplied to an input of a floating point subtractor 56 that carries out step 34 of FIG. 3.

Each address in ROM 48 contains an 11-bit number that is substantially equal to the inverse of the value represented by its address, multiplied by a factor of two or four, depending on whether the value represented by its address is greater than or less than $2^{\frac{3}{2}}$. Each address in ROM 48 also contains an additional bit indicating whether the multiplying factor is two or four. Thus ROM 48 implements step 26 of FIG. 3.

ROM 46 substantially implements step 24 of FIG. 3. For the IEEE p754 standard, the 8-bit exponent of D is in offset binary form. In such case, the value of the 8-bit number stored at each address of ROM 46 may be determined in accordance with the following algorithm:

1. Subtract the number 127 (i.e., 01111111 in binary) from the 8-bit address to place the number represented by the address in 2's complement binary form.
2. Invert each bit of the resulting 2's complement number in order to negate and offset the 2's complement number by one.
3. Double the result of step 2 by shifting it to the left by one bit.
4. Convert the result of step 3 back to offset binary form by adding the number 127 to the result.

When ROM 46 is accessed, the 8-bit number read out of ROM 46 is added to the indicating bit output generated by ROM 48 by an adder 53 in order to supply the 8-bit exponent of $1/A^2$. The indicating bit produced by ROM 48 is set to a 1 if the exponent is to be offset by 1 (i.e., when ROM 48 utilizes a multiplying factor of 2 to provide its mantissa output) and the indicating bit is set to a 0 when the exponent is to be offset by 2 (i.e., when ROM 48 utilizes a multiplying factor of 4 to provide its mantissa output).

ROM 50 and integer adder 52 implement the normalizing step 28 of FIG. 3. At each address in ROM 50 is stored an 11-bit mantissa of B that is a function of its address. Specifically, the number represented by the address is multiplied by the particular power of two needed to provide a mantissa between 1 and 2. An additional 4-bit number is also stored at each address in ROM 50 and indicates the negative of the exponent of the particular power of two that was used to compute the mantissa. Adder 52 adds this 4-bit number to the exponent of D to produce the exponent of B. The floating point value B is formed by concatenating the exponent supplied by adder 52, the N-bit mantissa from ROM 50, and the sign bit of D.

The floating point number B produced by ROM 50 and adder 52 and the floating point number $1/A^2$ from ROMs 46 and 48 are supplied as inputs to a floating point multiplier 54 which implements the function of step 32 of FIG. 3 by outputting the 32-bit floating point number $B/A^2$. This number, and the floating point number $1/A$ supplied by ROMs 42 and 44 are inputs to a floating point subtractor 56 which generates the 32-bit floating point number $(1/A - B/A^2)$ as its output, thereby implementing step 34 of FIG. 3.

Figure 2:
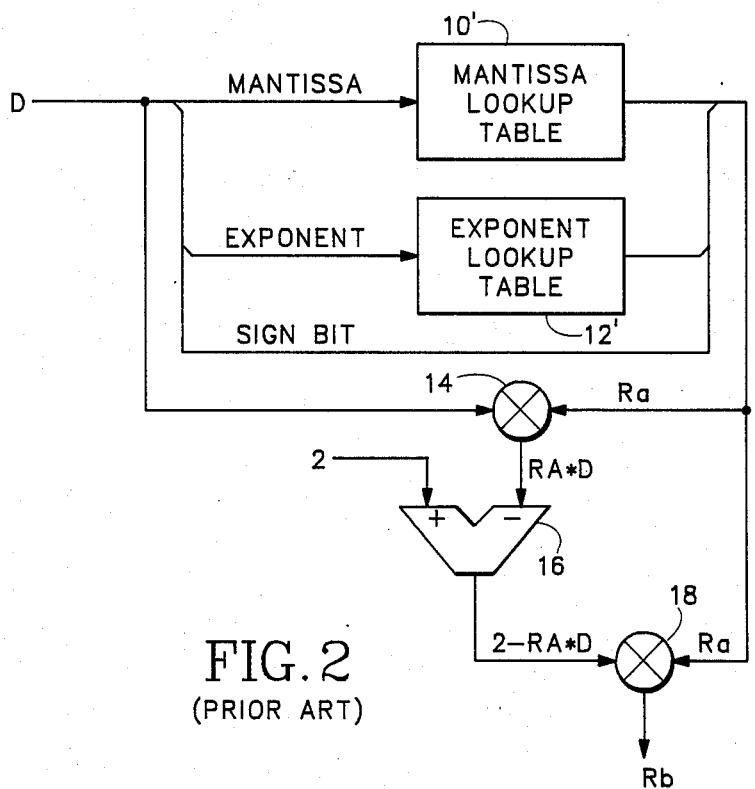
FIG. 2 is a block diagram of another circuit of the prior art for computing the reciprocal of a number.

The operations of ROMs 42–50 may be carried out simultaneously and the operations of adder 52, multiplier 54 and subtractor 56 may be carried out successively thereafter. Thus the circuit of FIG. 4 estimates $1/D$ in the time required for one ROM access, one integer addition, one floating point multiplication and one floating point subtraction. By comparison, the prior art circuit of FIG. 2 carries out its inversion in the time required for one ROM access, two floating point multiplications, and one floating point subtraction. Since an integer addition can normally be performed much more quickly than a floating point multiplication, the present invention as embodied in the circuit of FIG. 4 operates more quickly than the prior art circuit of FIG. 2 to invert a floating point number with similar accuracy.

Figure 5:
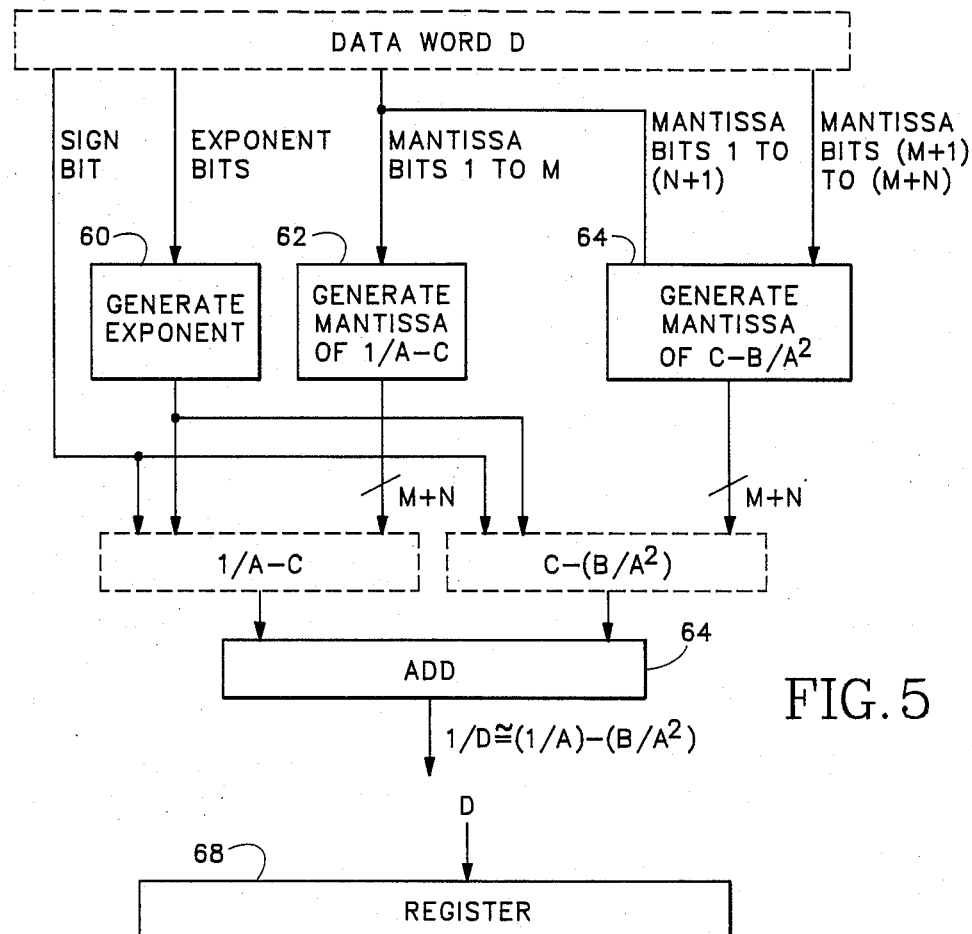
FIG. 5 is a signal flow diagram of a circuit for computing the reciprocal of a number in accordance with an alternative embodiment of the present invention.

FIG. 5 is a signal flow diagram illustrating an alternative embodiment of the invention, whereby a floating point number may be inverted in the time required to perform one table lookup and one floating point addition. In the alternative embodiment of the invention, as in the preferred embodiment of the invention, the inverse of a floating point number D is also computed in accordance with relation [5] hereinabove, repeated below for convenience.

$$(1/D) \approx (1/A) - (B/A^2) \quad [5]$$

However, the operation of the alternative embodiment can be more clearly understood by first modifying relation [5] to form relation [6] as follows:

$$(1/D) \approx (1/A) - C - B/A^2 + C. \quad [6]$$

In relation [6] C is a floating point number that is a function of the value of the first $N+1$ bits of A. Since the value of C is both added to and subtracted from the right hand side of relation [5] to form relation [6], the right hand sides of relations [5] and [6] are equivalent. Relation [6] can be rewritten as follows:

$$(1/D) \approx [(1/A) - C] + [C - B/A^2]. \quad [7]$$

The value of C is approximately equal to $\frac{1}{2}A$ and its particular value is selected for each value of the first $N+1$ bits of A so that the floating point quantity $[(1/A)-C]$ and the floating point quantity $[C-B/A^2]$ of relation [7] have the same particular exponent as the floating point quantity $\frac{1}{2}A$. The exponents and mantissas of the quantities $[(1/A)-C]$ and $[C-B/A^2]$ can be generated in normalized floating point form in response to the exponent and mantissa of D utilizing simultaneous table lookup operations, and the result summed by a floating point adder to supply the approximate value of $1/D$ in accordance with relation [7].

With reference to FIG. 5, the exponent bits of the data word D to be inverted are negated and offset by one in a step 60 to provide the common exponent of both quantities $[(1/A)-C]$ and $[C-B/A^2]$. The mantissa of D includes at least M most significant bits and N next most significant bits, where in the alternative embodiment of the invention, M is suitably equal to 2N or $2N+1$. For convenience of discussion hereinbelow these $M+N$ bits of the mantissa of D are referenced as bits 1 through $M+N$ in decreasing order of significance. The quantity A is the number represented by the sign, exponent and bits 1 through M of the mantissa of D, bits $M+1$ and beyond being taken as 0. The quantity B is a floating point number having an $M+N$ bit mantissa approximating the difference between the magnitudes of D and A within the accuracy provided by an $M+N$ bit mantissa. The mantissa of $[(1/A)-C]$ is produced in step 60 in response to bits 1 through M of the mantissa of D. This mantissa, along with the exponent output of step 60 and the sign bit of D are concatenated to form the normalized floating point representation of $[(1/A)-C]$.

The $M+N$ bit mantissa of the quantity $[C-B/A^2]$ is provided in step 62 utilizing bits 1 through $N+1$ and bits $M+1$ through $M+N$ of the mantissa of D to estimate values of the mantissas of A and B. The 32-bit floating point quantity $[C-B/A^2]$ is then formed by concatenating the sign bit of D, the exponent from step 60 and the mantissa from step 64. The two floating point quantities $[(1/A)-C]$ and $[C-B/A^2]$ are then summed in step 66 resulting in the approximation of $1/D$ in accordance with relation [7] hereinabove, the approximation being a floating point number having a mantissa accurate to $M+N$ bits.

Figure 6:
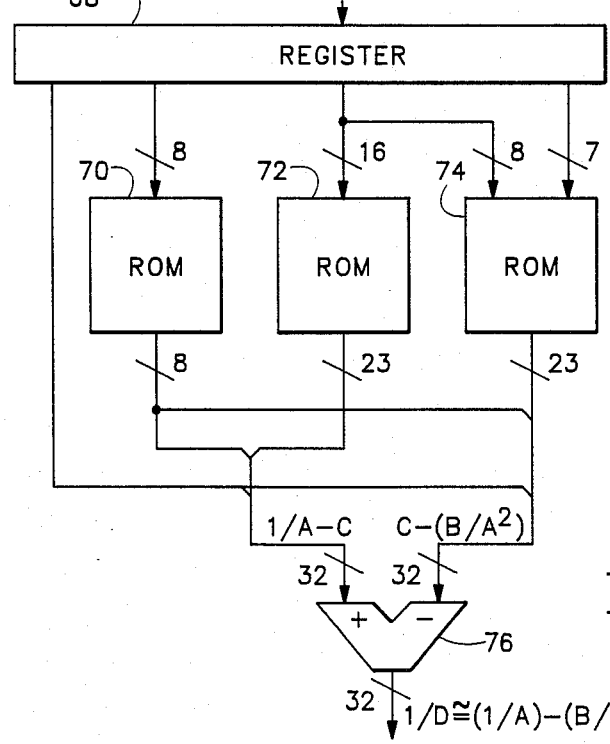
FIG. 6 is a block diagram of a circuit for computing the reciprocal of a number in accordance with the alternative embodiment of the present invention.

FIG. 6 illustrates in block diagram form a circuit for implementing the alternative embodiment of the invention illustrated in FIG. 5, which circuit inverts a number D suitably stored in a register 68. In the example of FIG. 6, the number D is a 32-bit floating point number formatted in accordance with the previously mentioned IEEE standard, having a single sign bit, an 8-bit exponent, and a 23-bit mantissa. The value of M is chosen to be 16 and the value of N is chosen to be 7. Step 60 of FIG. 5 is implemented employing a ROM 70 which stores at each address an 8-bit exponent determined by inverting the bits of the address and then subtracting three from the result, ROM 70 being addressed by the 8-bit exponent of D stored in register 68. Step 62 of FIG. 5 is implemented with a ROM 72 addressed by the M most significant bits (bits 1-16) of the mantissa of D stored in register 68. ROM 72 stores the 23-bit mantissa of $[(1/A)-C]$ at each address and the floating point quantity $[(1/A)-C]$ is formed by concatenating the sign bit of D in register 68, the exponent output of ROM 70 and the mantissa output of ROM 72. Step 64 of FIG. 5 is implemented using a ROM 74 addressed by the 15 bits 1 through $N+1$ and bits $M+1$ through $M+N$ of the mantissa. ROM 74 stores at each of its addresses a 23-bit mantissa of the floating point quantity $[C-B/A^2]$. The floating point quantity $[C-B/A^2]$ is formed by concatenating the sign bit of D in register 68, the exponent output of ROM 70 and the mantissa output of ROM 74.

Figure 1:
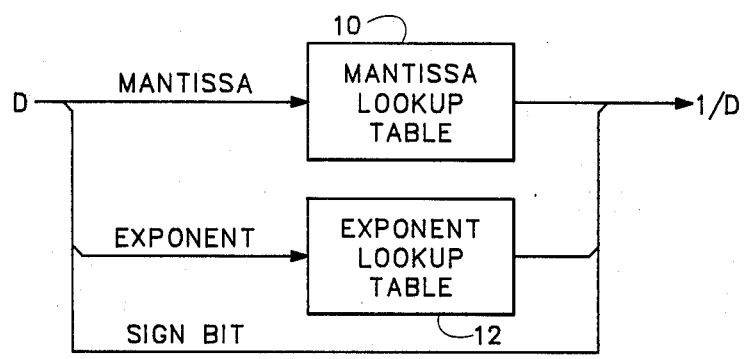
FIG. 1 is a block diagram of a circuit of the prior art for computing the reciprocal of a number.

The two floating point quantities $[(1/A)-C]$ and $[C-B/A^2]$ thus formed are summed by a floating point adder 76 (implementing step 66 of FIG. 5) to provide the 32-bit approximation of $1/D$ in accordance with relation [7] hereinabove. From FIG. 6 it can be seen that read access of ROMs 70, 72 and 74 can be carried out simultaneously and the inversion process can be completed immediately thereafter by adder 76. The floating point number D stored in register 68 can be inverted in the time required for one ROM access and one floating point addition. Thus the circuit of FIG. 6 inverts a number substantially more quickly than the prior art circuit of FIG. 2 and the circuit of FIG. 4 implementing the preferred embodiment of the invention. However, the circuit of FIG. 6 utilizes substantially larger ROMs (i.e. 16 address bits) than the largest ROM (12 address bits) employed by the circuit of FIG. 4. Nonetheless, the ROMs of the circuit of FIG. 6 are still relatively smaller than the ROM required to implement the prior art circuit of FIG. 1 and are small enough to be economically feasible.

As previously mentioned, the value of C utilized in relation [7] is approximately $\frac{1}{2}A$ and its specific value is selected such that for each value of the first $N+1$ bits of A, the floating point quantity $[(1/A)-C]$ and the floating point quantity $[C-B/A^2]$ have the same particular exponent as the floating point quantity $\frac{1}{2}A$. This ensures that the output of ROM 70 can be employed to provide the exponent of both floating point quantities $[(1/A)-C]$ and $[C-B/A^2]$, and permits ROMs 72 and 74 of FIG. 6 to produce mantissas for $[(1/A)-C]$ and $[C-B/A^2]$ that are in normalized form. Various values of C can be employed for each value of A to achieve the desired result. When, as in the example of FIG. 6, the mantissa of D is expressed in binary form, a suitable value of C for each value of A can be chosen according to the following algorithm:

1. Let X be a floating point number having the same exponent as ½A but having a mantissa of 1.
2. Let Y be the largest floating point number having the same exponent as ½A and having an M+N bit mantissa.
3. Let AMAX be the largest value that can be represented by a floating point number having the same exponent as ½A and having M mantissa bits, wherein mantissa bits 1 through N+1 are similar in state to mantissa bits 1 through N+1 of A.
4. Choose C to be the lesser of Y or [(1/AMAX)−X].

Circuits in accordance with preferred and alternative embodiments of the invention have been described, each circuit generating an output signal representing a floating point number approximating the reciprocal (1/D) of an input floating point number D represented by an input signal in accordance with the expression $(1/D) \approx (1/A) - (B/A^2)$. In the preferred embodiment of the invention, lookup tables are utilized to simultaneously generate 1/A, and $1/A^2$ and B. The quantity $B/A^2$ is then produced by supplying $1/A^2$ and B as inputs to a multiplying circuit. Thereafter, the output of the multiplying circuit is subtracted from 1/A to provide the output number approximating 1/D. In accordance with the alternative embodiment of the invention, lookup tables are employed to generate the quantities $[(1/A) - C]$ and $[C - (B/A^2)]$ where the value of C is chosen for each value of A so that the terms $[(1/A) - C]$ and $[C - (B/A^2)]$ are each floating point numbers having the same exponent as the floating point number (½A). The terms $[(1/A) - C]$ and $[C - (B/A^2)]$ are then summed to provide the estimate of 1/D in accordance with the expression $(1/D) \approx (1/A) - (B/A^2)$.

While preferred and alternative embodiments of the present invention have been shown and described, it will be apparent to those skilled in the art that many other changes and modifications may be made without departing from the invention in its broader aspects. The appended claims are therefore intended to cover all such changes and modifications as fall within the true spirit and scope of the invention.

I claim:

1. A circuit for generating an output signal representing an output number approximating a reciprocal of an input number of magnitude D represented by an input signal, said input signal comprising a set of M most significant bits and a set of N next most significant bits, the circuit comprising:
    first means responsive to said input signal for generating a first signal representing a first number approximating 1/A, wherein A is a number in accordance with said M most significant bits of said input signal;
    second means responsive to said input signal for generating a second signal representing a second number approximating $B/A^2$, wherein B is a number approximately equal to D−A; and
    third means for combining said first and second signals to generate said output signal representing said output number.

2. The circuit in accordance with claim 1 wherein said second means comprises:
    means responsive to said input signal for generating a third signal representing a third number approximating $1/A^2$;
    means responsive to said input signal for generating a fourth signal representing a fourth number equal to B; and
    multiplying means responsive to said third and fourth signals for generating said second signal representing said second number.

3. The circuit in accordance with claim 1 wherein said third means comprises means for subtracting said second number from said first number such that said output number is equal to a difference between said first and second numbers.

4. A circuit for generating an output signal representing an output floating point number approximately equal to an inverse of an input floating point number represented by an input signal, said input signal comprising an exponent bit set, a most significant mantissa bit set, and a less significant mantissa bit set, the circuit comprising:
    first means responsive to said input signal for generating a first signal representing a mantissa of a first floating point number approximately equal to a difference between a given number and an inverse of a second floating point number, said second floating point number being of magnitude defined by said exponent bit set and said most significant mantissa bit set of said input signal;
    second means responsive to said input signal for generating a second signal representing a mantissa of third floating point number substantially equal to a difference between said given number and a product of a square of an inverse of said second floating point number and a fourth floating point number defined by the exponent bit set and said less significant mantissa bit set of said input signal;
    third means responsive to said exponent bit set for generating a third signal representing exponents of said first and third floating point numbers; and
    fourth means responsive to said first, second and third signals for generating said output signal representing said output floating point number, said output floating point number being substantially equal to an arithmetic combination of said first and third floating point numbers.

5. The circuit in accordance with claim 4 wherein said second and third means select said given number in accordance with said input floating point number such that said first and third floating point numbers have exponents equal to an exponent of a floating point number the magnitude of which is one half of an inverse of said input floating point number.

6. A circuit for generating an output signal representing an output floating point number approximating a reciprocal of an input floating point number of magnitude D represented by an input signal, said input signal comprising bits representing an exponent and a mantissa of said input floating point number, bits representing said mantissa including a set of M most significant bits and a set of N next most significant bits, where M and N are integers, the circuit comprising:
    first means responsive to said input signal for generating a first signal representing a first floating point number approximating (1/A)−C, wherein A is a magnitude of a floating point number represented by said input signal bits representing said exponent and said M most significant bits of said mantissa, and wherein C is a number of magnitude approximately equal to ½A;

second means responsive to said input signal for generating a second signal representing a second floating point number approximating $C-B/A^2$, wherein B is a floating point number approximately equal to $D-A$; and means for combining said first and second signals to generate said output signal representing said output floating point number.

7. The circuit in accordance with claim 6 wherein C is of magnitude such that said first and second floating point numbers have exponents equal to an exponent of a floating point number of magnitude $\frac{1}{2}A$.

8. A method for generating an output signal representing an output number approximating a reciprocal of an input number of magnitude D represented by an input signal, said input signal comprising a set of M most significant bits and a set of N next most significant bits of said input number, the method comprising the steps of:

generating in response to said input signal a first signal representing a first number approximating $1/A$, wherein A is a number represented by said M most significant bits of said input number;

generating in response to said input signal a second signal representing a second number approximating $(B/A^2)$, wherein B is a number approximately equal to $D-A$; and generating said output signal in response to said first and second signals such that said output number represented by said output signal is equal to a combination of said first and second numbers.

9. The method in accordance with claim 8 wherein said step of generating said second signal comprises the substeps of:

generating in response to said input signal a third signal representing a third number approximating $1/A^2$;

generating in response to said input signal a fourth signal representing a fourth number equal to B; and generating said second signal in response to said third and fourth signals, said second number represented by said second signal comprising a product of said third and fourth numbers represented by said third and fourth signals.

10. The method in accordance with claim 8 wherein said output number represents a difference between said first and second numbers.

11. A method for generating an output signal representing an output floating point number approximating a reciprocal of an input floating point number of magnitude D represented by an input signal, said input signal comprising bits representing a sign, an exponent and a mantissa of said input floating point number, bits representing said mantissa including a set of M most significant bits and a set of N next most significant bits, where M and N are integers, the method comprising the steps of:

generating in response to said input signal a first signal representing a first floating point number approximating $(1/A)-C$, wherein A is a floating point number represented by input signal bits representing said sign, said exponent and said M most significant bits of said mantissa, and wherein C is a number of magnitude that is a function of A;

generating in response to said input signal a second signal representing a second floating point number approximating $(C-B/A^2)$, wherein B is a floating point number approximately equal to $D-A$; and combining said first and second signals to generate said output signal representing said output floating point number.

12. The method in accordance with claim 11 wherein the magnitude of the number C is such that for each value of A said first and third floating point numbers have exponents equal to an exponent of a floating point number of magnitude $\frac{1}{2}A$.

* * * * *